US012583089B2

(12) United States Patent
Cziepluch et al.

(10) Patent No.: US 12,583,089 B2
(45) Date of Patent: Mar. 24, 2026

(54) ELECTRIC HAND-HELD POWER TOOL WITH BALL-TYPE LATCHING CLUTCH

(71) Applicant: Hilti Aktiengesellschaft, Schaan (LI)

(72) Inventors: Sarah Cziepluch, Landsberg am Lech (DE); Rory Britz, Buchloe (DE); Bence Gabor Szucs, Augsburg (DE)

(73) Assignee: Hilti Aktiegesellschaft, Schaan (LI)

( * ) Notice: Subject to any disclaimer, the term of this patent is extended or adjusted under 35 U.S.C. 154(b) by 0 days.

(21) Appl. No.: 17/918,186

(22) PCT Filed: Apr. 14, 2021

(86) PCT No.: PCT/EP2021/059648
§ 371 (c)(1),
(2) Date: Oct. 11, 2022

(87) PCT Pub. No.: WO2021/213857
PCT Pub. Date: Oct. 28, 2021

(65) Prior Publication Data

US 2023/0132195 A1 Apr. 27, 2023

(30) Foreign Application Priority Data

Apr. 23, 2020 (EP) .................................... 20171006

(51) Int. Cl.
*B25D 16/00* (2006.01)

(52) U.S. Cl.
CPC ......... *B25D 16/003* (2013.01); *B25D 16/006* (2013.01); *B25D 2217/0019* (2013.01); (Continued)

(58) Field of Classification Search
CPC ................ B25D 16/003; B25D 16/006; B25D 2217/0019; B25D 2250/095; B25D 2250/165; B25D 2250/321
See application file for complete search history.

(56) References Cited

U.S. PATENT DOCUMENTS 1,805,692 A * 5/1931 Ferenci ..................... F16D 7/10 192/103 B
2,886,075 A * 5/1959 Skoog ................... B25B 23/141 81/475

(Continued)

FOREIGN PATENT DOCUMENTS

CN 1910014 A 2/2007
CN 204658370 U 9/2015

(Continued)

OTHER PUBLICATIONS

International Search Report of PCT/EP2021/059648 dated Jul. 9, 2021.

(Continued)

*Primary Examiner* — Stephen F. Gerrity
*Assistant Examiner* — David G Shutty
(74) *Attorney, Agent, or Firm* — Davidson Kappel LLC

(57) ABSTRACT

Electric hand-held power tool, in particular a hammer drill and/or rotary hammer, having a function setting tube, which can be actuated via a manual function selector switch to bring about various operating modes, a guide tube equipped with a tool fitting, and having a ball-type latching clutch for transmitting a rotary movement from the function setting tube to the guide tube, wherein the ball-type latching clutch has a radial aperture formed in the function setting tube, a main latching depression formed in the guide tube, a coupling ball mounted in the radial aperture and intended to engage in the main latching depression, and a spring-loaded cone ring against whose actuating force the coupling ball can deflect in the radial direction, wherein the guide tube has formed therein an auxiliary depression that is different from the main latching depression and whose opening angle is larger than an opening angle of the main latching depression.

19 Claims, 10 Drawing Sheets

(52) U.S. Cl.
CPC .. *B25D 2250/095* (2013.01); *B25D 2250/165* (2013.01); *B25D 2250/321* (2013.01)

(56) References Cited

U.S. PATENT DOCUMENTS

| | | | | | |
|---|---|---|---|---|---|
| 3,020,789 | A * | 2/1962 | Etzkorn | B25B 23/141 | 81/474 |
| 3,596,542 | A * | 8/1971 | Wallace | B25B 23/145 | 81/474 |
| 3,932,904 | A * | 1/1976 | Nilsson | B25F 3/00 | 7/165 |
| 4,019,589 | A * | 4/1977 | Wallace | B25B 23/145 | 91/325 |
| 4,265,320 | A * | 5/1981 | Tanaka | B25B 23/147 | 192/150 |
| 4,311,224 | A * | 1/1982 | Kato | F16D 47/02 | 464/36 |
| 4,386,689 | A * | 6/1983 | Kato | F16D 7/10 | 408/139 |
| 4,429,775 | A * | 2/1984 | Teramoto | B25B 23/145 | 192/93 A |
| 4,431,062 | A * | 2/1984 | Wanner | B25D 17/06 | 173/104 |
| 4,548,305 | A * | 10/1985 | Anderson | F16D 43/206 | 464/36 |
| 4,967,888 | A * | 11/1990 | Lippacher | F16D 41/18 | 81/474 |
| 5,005,684 | A * | 4/1991 | Fujii | F16D 7/08 | 464/36 |
| 5,588,496 | A * | 12/1996 | Elger | B25B 23/1405 | 192/56.1 |
| 5,778,989 | A * | 7/1998 | Neumaier | B25B 23/0064 | 173/217 |
| 6,425,837 | B1 * | 7/2002 | Ochiai | F16D 7/10 | 464/36 |
| 7,334,647 | B2 * | 2/2008 | Hahn | B25F 5/001 | 173/216 |
| 7,665,392 | B2 * | 2/2010 | Tokunaga | F16D 7/08 | 81/474 |
| 8,136,607 | B2 * | 3/2012 | Frauhammer | B25B 23/141 | 173/180 |
| 2005/0284648 | A1 | 12/2005 | Frauhammer et al. | | |
| 2009/0223692 | A1 | 9/2009 | Yoshikane et al. | | |
| 2015/0197002 | A1 | 7/2015 | Didier et al. | | |
| 2017/0217000 | A1 * | 8/2017 | Dierickx | B25B 23/141 | |

FOREIGN PATENT DOCUMENTS

| | | | | |
|---|---|---|---|---|
| CN | 108128481 | A | 6/2018 | |
| DE | 2210175 | A1 | 9/1972 | |
| DE | 3804414 | A1 * | 8/1989 | E21C 3/34 |
| DE | 19717465 | A1 | 10/1998 | |
| DE | 102004047470 | A1 * | 4/2006 | B25D 16/003 |
| GB | 1324583 | A | 7/1973 | |
| GB | 2324485 | A * | 10/1998 | B23B 31/38 |
| JP | 2001153152 | A | 6/2001 | |
| JP | 2014176920 | A | 9/2014 | |
| TW | M463173 | U | 10/2013 | |
| WO | WO-2016059039 | A1 * | 4/2016 | A61B 17/1628 |
| ZA | 200501509 | B | 10/2006 | |

OTHER PUBLICATIONS

邯郸职业技术学院学报，第期，贾延军，锥环联接的研究，Sep. 30, 1999, pp. 9 to 12. https://www.cnki.net; JIA et al.: “Study of conical ring couplings,” *Journal of Handan University,* 1999, No. 3 (No. 40 overall), see machine translation.

* cited by examiner

ELECTRIC HAND-HELD POWER TOOL WITH BALL-TYPE LATCHING CLUTCH

BACKGROUND

The present invention relates to an electric hand-held power tool, in particular to a hammer drill and/or rotary hammer. The hand-held power tool is equipped with a function setting tube which can be actuated via a manual function selector switch. It is thus possible to set various operating modes, such as, for example, chisel-positioning, chipping, hammer drilling, and also drilling without impact. The hand-held power tool has a guide tube, which is equipped with a tool fitting, and a ball-type latching clutch for transmitting a rotary movement from the function setting tube to the guide tube. The ball-type latching clutch has a radial aperture formed in the function setting tube, a preferably groove-shaped main latching depression formed in the guide tube, a coupling ball mounted in the radial aperture and intended to engage in the main latching depression, and a spring-loaded cone ring. The coupling ball can deflect in the radial direction, with respect to the guide tube, against an actuating force of the spring-loaded cone ring. Should there occur jamming of a tool received in the tool fitting, the guide tube comes to a standstill. On the other hand, the function setting tube is continued to be driven, for example in the hammer drilling operating mode. If the torque applied by the guide tube overcomes the actuating force of the spring-loaded cone ring, the coupling ball comes out of the main latching depression and is moved in the circumferential direction along the guide tube. A situation whereby damage occurs to one or more transmission components of the hand-held power tool can be prevented in such a way. If the torque applied by the guide tube undershoots the actuating force of the spring-loaded cone ring, the coupling ball is pressed back into the main latching depression by the cone ring.

Hand-held power tools of the type stated at the outset are known, in principle, from the prior art.

SUMMARY OF THE INVENTION

It is an object of the present invention to provide a hand-held power tool which can be operated in a particularly reliable manner.

The present invention provides that the guide tube has formed therein an auxiliary depression which is different than the main latching depression and whose opening angle is larger than an opening angle of the main latching depression. A respective opening angle is preferably situated in a radial section plane of the guide tube. The radial section plane of the guide tube is preferably a section plane whose normal to the surface runs parallel, preferably coaxial, to the working axis (longitudinal axis) of the guide tube. It has been found to be advantageous if the opening angle of the main latching depression is between 70 degrees and 80 degrees, preferably 75 degrees. In a particularly preferred embodiment, the opening angle of the auxiliary depression is larger than 90 degrees, preferably larger than 120 degrees.

The invention includes the finding that there are situations in which a coupling ball which has been moved out of the main latching depression, that is to say after a safety stop of the ball-type latching clutch, does not return to its intended position into the main latching depression, but rather comes to a standstill on a nondepressed surface of the guide tube. In this case, a radial force between the guide tube and the coupling ball is of such size that the function setting tube can no longer be axially adjusted to bring about the various operating modes of the hand-held power tools. By virtue of the auxiliary depression provided according to the invention and having a larger opening angle, there is provided a defined position of the coupling ball on the surface of the guide tube, with the result that the function setting tube can be moved in the axial direction at any time.

It has been found to be advantageous if the auxiliary depression is longer than the main latching depression in the axial direction. In a particularly preferred embodiment, the main latching depression and the auxiliary depression are spaced apart from one another in the circumferential direction, with respect to the guide tube, by a web. It has been found to be advantageous if a web width of the web is less than 1 mm in the circumferential direction. The web width can be less than 0.5 mm. In a particularly preferred embodiment, the web width is 0.4 mm.

It has been found to be advantageous if an opening width, with respect to a circumferential circle of the guide tube, of the auxiliary depression is larger than an opening width, with respect to the circumferential circle, of the main latching depression. What is to be understood by circumferential circle of the guide tube is preferably a circle which runs along an outer surface of the guide tube and is tangent to all of the webs of the guide tube. Here, the opening width of the main latching depression is preferably the arc length of that part of the circumferential circle spanning the main latching depression. Here, the opening width of the auxiliary depression is preferably the arc length of that part of the circumferential circle spanning the auxiliary depression.

In a particularly preferred embodiment, the main latching depression and/or the auxiliary depression are or is groove-shaped in form, preferably with a longer extent in the axial direction of the guide tube. A main latching depression, particularly one which is groove-shaped in form, can have a variable radius of curvature in the radial section plane and/or a flank portion which is rectilinear in certain portions. If this is the case, the opening angle of the main latching depression is preferably predefined by that flank portion of the main latching depression that has the longest extent in the radial direction. Alternatively, if the main latching depression, particularly one which is groove-shaped in form, has a constant radius of curvature in the radial section plane, the opening angle of the main latching depression is preferably spanned by those secants which, on the one hand, are in each case tangent to the web and which, on the other hand, intersect at the base point of the main latching depression.

An auxiliary depression, particularly one which is groove-shaped in form, can have a constant radius of curvature in the radial section plane. In this case, the opening angle of the main latching depression is preferably spanned by those secants which, on the one hand, are in each case tangent to the web and which, on the other hand, intersect at the base point of the main latching depression. Alternatively, an auxiliary depression, particularly one which is groove-shaped in form, can have a variable radius of curvature in the radial section plane and/or flanks which are rectilinear in certain portions. In this case, the opening angle of the auxiliary depression is preferably spanned by those secants which, on the one hand, are in each case tangent to the web and which, on the other hand, intersect at the base point of the auxiliary depression. In a particularly preferred embodiment, there are provided a plurality of main latching depressions and a plurality of auxiliary depressions in the guide tube. It has been found to be advantageous if the main latching depressions and the auxiliary depressions alternate along the circumferential direction of the guide tube.

It has been found to be advantageous if the cone ring has a first cone shoulder and a second cone shoulder which is different than the first cone shoulder. With particular preference, the first cone shoulder and the second cone shoulder have different angles of inclination with respect to the axial direction. It has been found to be advantageous if the first cone shoulder, in particular that cone shoulder which extends in the radial direction further away from the guide tube, has an angle of inclination between 50 degrees and 60 degrees, preferably 55 degrees. The second cone shoulder preferably has an angle of inclination of between 35 degrees and 45 degrees, preferably 38 degrees. In a further preferred embodiment, the radial aperture has, in the function setting tube, a cylindrical passage and/or a cone bevel. With particular preference, the cone bevel has a cone angle of between 15 degrees and 25 degrees, preferably 20 degrees, wherein the cone angle is based on the radial direction.

In a particularly preferred embodiment, the electric hand-held power tool takes the form of a battery-operated combination hammer. The maximum working torque which is able to be transmitted via the ball-type latching clutch (the coupling balls are paired with the main latching depressions) is preferably between 30 and 40 newton-meter. An axial force that is to be applied for axial displacement of the function setting tube is preferably between 30 and 100 newton, in particular between 35 and 45 newton. A torque that is required to overcome the auxiliary depressions (the coupling balls are paired with the auxiliary depressions) is preferably at most 50 percent, particularly preferably at most 20 percent, of the maximum working torque that is able to be transmitted via the ball-type latching clutch.

The invention also provides a guide tube for an electric hand-held power tool, in particular for a hammer drill and/or rotary hammer, wherein the guide tube has a main latching depression for at least partial engagement of a coupling ball, and an inner volume for receiving an exciter piston of an impact mechanism. The guide tube has formed therein an auxiliary depression which is different than the main latching depression and whose opening angle is larger than an opening angle of the main latching depression. The guide tube according to the invention can be configured in a corresponding manner by means of the exemplary embodiments described with reference to the electric hand-held power tool.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to give useful further combinations. In the figures, identical and similar components are denoted by the same reference signs. In the figures:

DETAILED DESCRIPTION

Figure 1A:
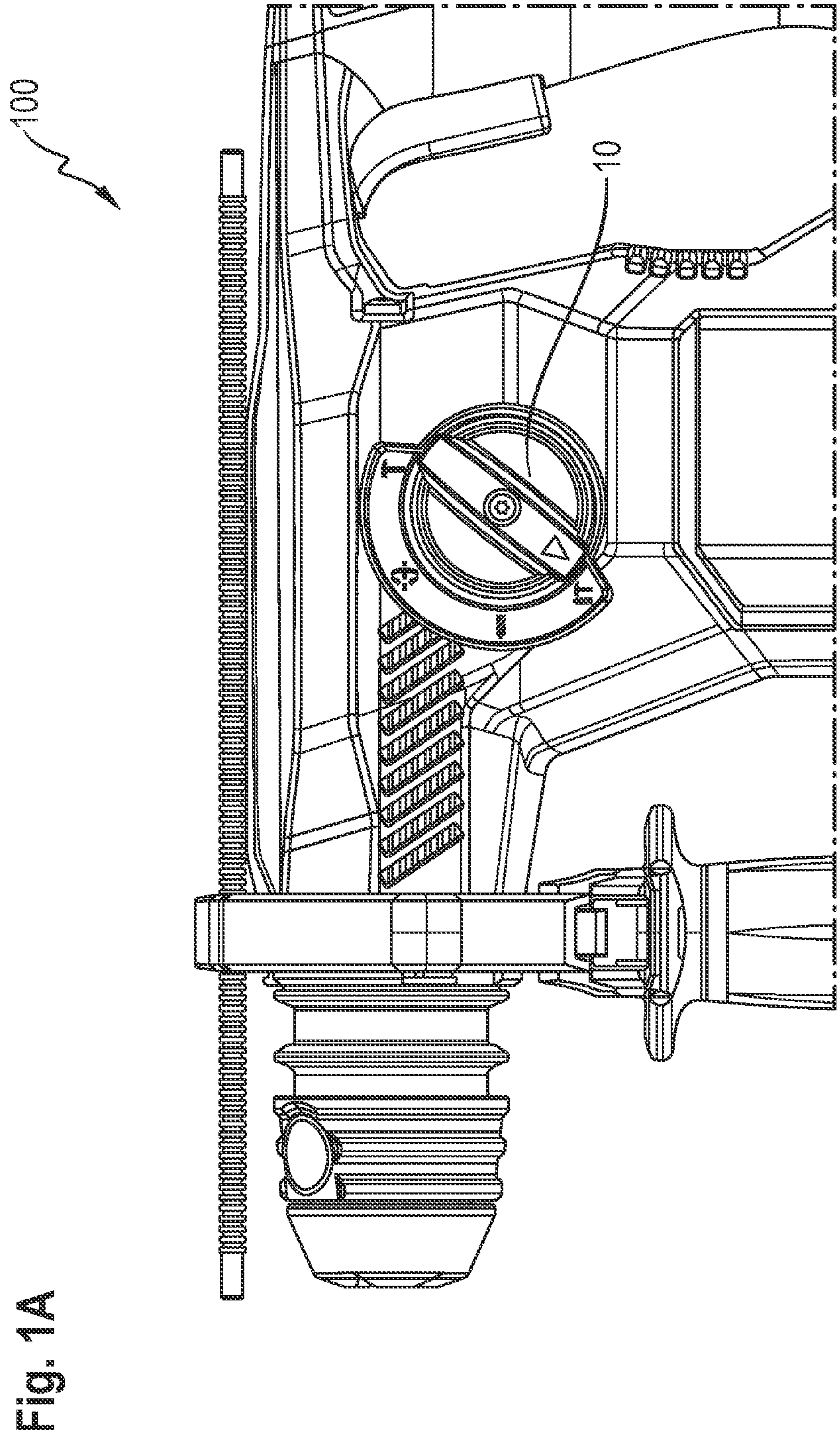
FIG. 1A shows a first exemplary embodiment of a hand-held power tool according to the invention.
Figure 5:
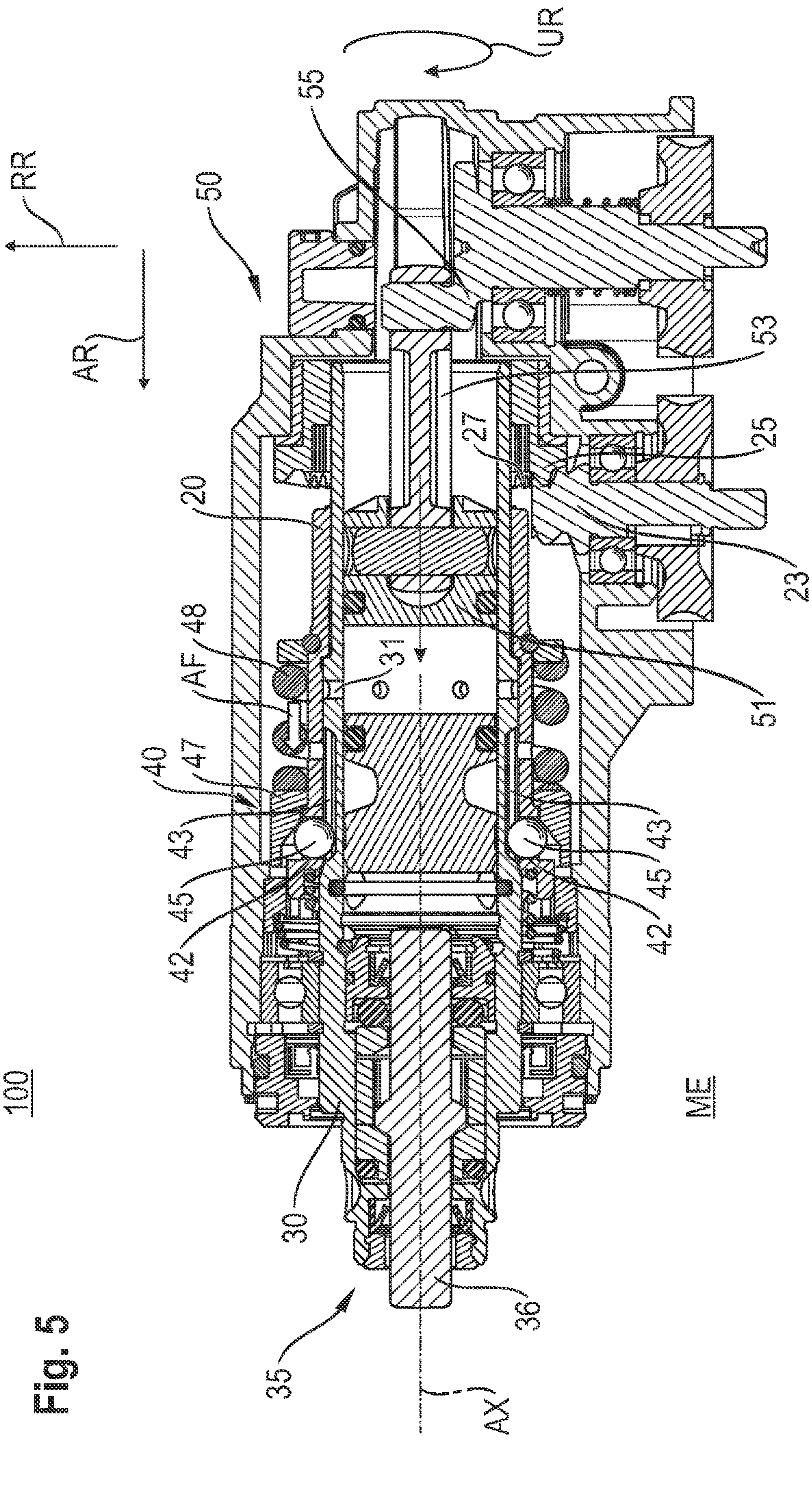
FIG. 5 shows the hand-held power tool of FIG. 1B in a different operating mode.

A first preferred exemplary embodiment of an electric hand-held power tool 100 according to the invention is illustrated in FIG. 1A. The hand-held power tool 100 is by way of example in the form of a combination hammer. The hand-held power tool 100 is equipped with a manual function selector switch 10 via which various operating modes of the hand-held power tools 100 can be set. Thus, FIG. 1B shows by way of example a section through the hand-held power tool 100 in the hammer drilling operating mode BH, whereas FIG. 5 shows by way of example a section through the hand-held power tool 100 in the chipping operating mode ME.

Figure 1B:
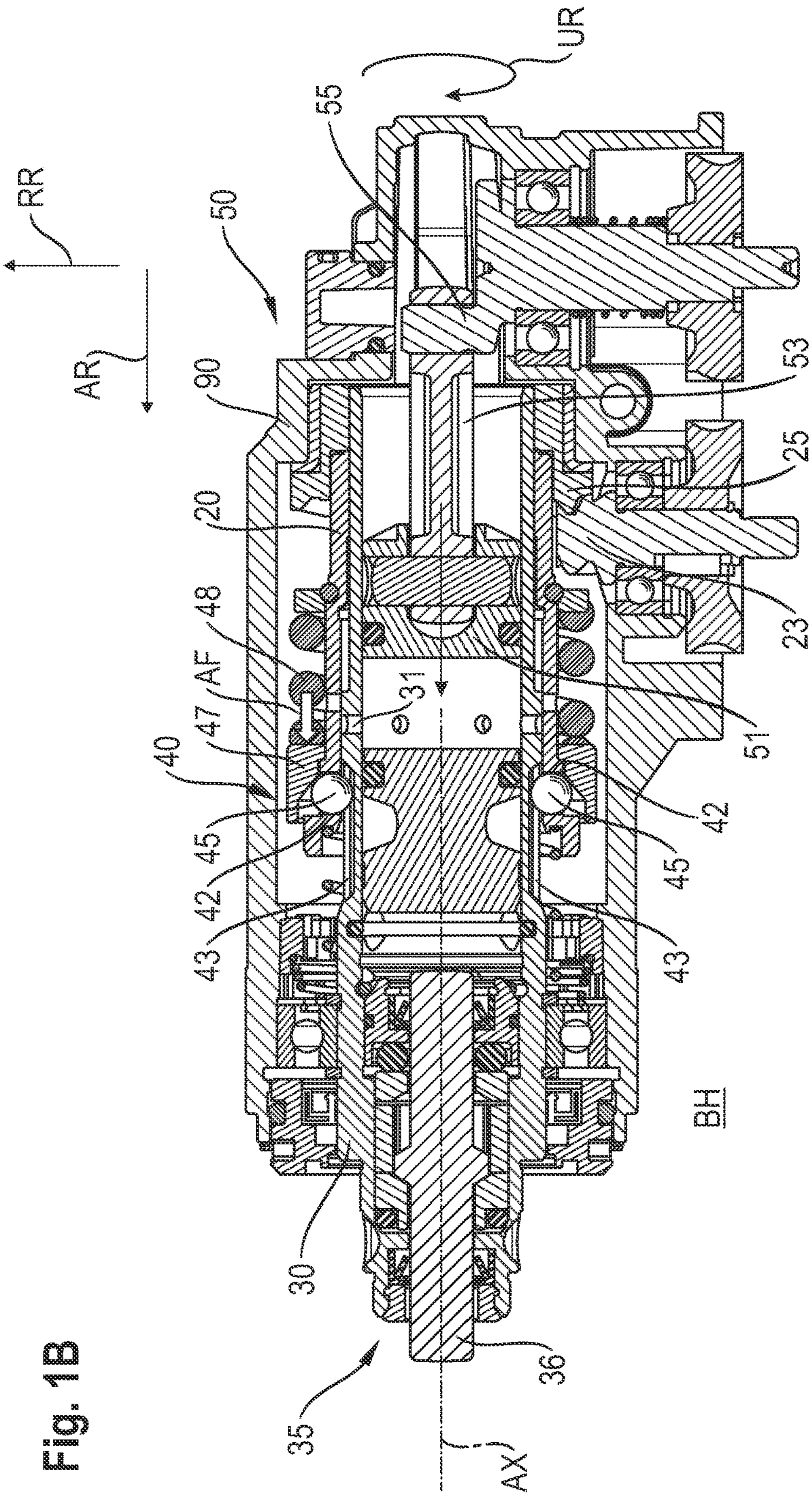
FIG. 1B shows a sectional view through the hand-held power tool.

As shown for example in FIG. 1B, electric hand-held power tool 100 is equipped with a cylindrical guide tube 30 which has a tool fitting 35. In the tool fitting 35 there is received a chisel 36, only part of which is illustrated in FIG. 1B. The hand-held power tool 100 has a function setting tube 20 which can be moved in the axial direction AR to bring about various operating modes via said manual function selector switch 10. The cylindrical function setting tube 20 is arranged coaxially to the guide tube 30.

The hand-held power tool 100 is likewise equipped with a pneumatic impact mechanism 50, which has an exciter piston 51 which is movable in the axial direction AR along a working axis AX within the guide tube 30. The exciter piston 51 is coupled via a connecting rod 53 to an impact-mechanism eccentric wheel 55, which is driven via an electric motor that has not been shown here. By means of the exciter piston 51 it is possible for there to be generated, within the guide tube 30, a periodic impact-mechanism pressure since, in the hammer drilling operating mode BH shown in FIG. 1B, a vent opening 31 of the guide tube 30 is closed by the function setting tube 20.

Both the function setting tube 20 and the guide tube 30 are mounted in a housing 90 of the hand-held power tool 100 so as to be rotatable about the working axis AX. In order for the function setting tube 20 to be caused to rotate about the working axis AX, the hand-held power tool 100 has a bevel gear 23, which can be driven by the electric motor that has not been shown here. The bevel gear 23 in turn drives a cone ring 25, with which the function setting tube 20—at least in the hammer drilling operating mode BH illustrated in FIG. 1—is in form-fitting engagement in the circumferential direction UR.

The hand-held power tool 100 further has a ball-type latching clutch 40 for transmitting the rotary movement from the function setting tube 20 to the guide tube 30. For this purpose, the ball-type latching clutch 40 is equipped with a radial aperture 42 formed in the function setting tube 20. The ball-type latching clutch 40 also has a coupling ball 45 mounted in the radial aperture 42. The coupling ball 45 is intended to engage in a main latching depression 43 which is formed in the guide tube 30. If the coupling ball 45 is in engagement with the main latching depression 43, a rotary movement can be transmitted from the function setting tube 20 to the guide tube 30. In the presently illustrated exemplary embodiment, the guide tube 30 has a plurality of main latching depressions 43 which are formed on the guide tube 30 in the circumferential direction UR. Accordingly, a plurality of coupling balls 45 and likewise a plurality of radial apertures 42 are also provided. The ball-type latching clutch 40 has a cone ring 47 which is spring-loaded by means of the spring 48 and against whose actuating force AF the coupling balls 45 can deflect outward in the radial direction RR.

Figure 2A:
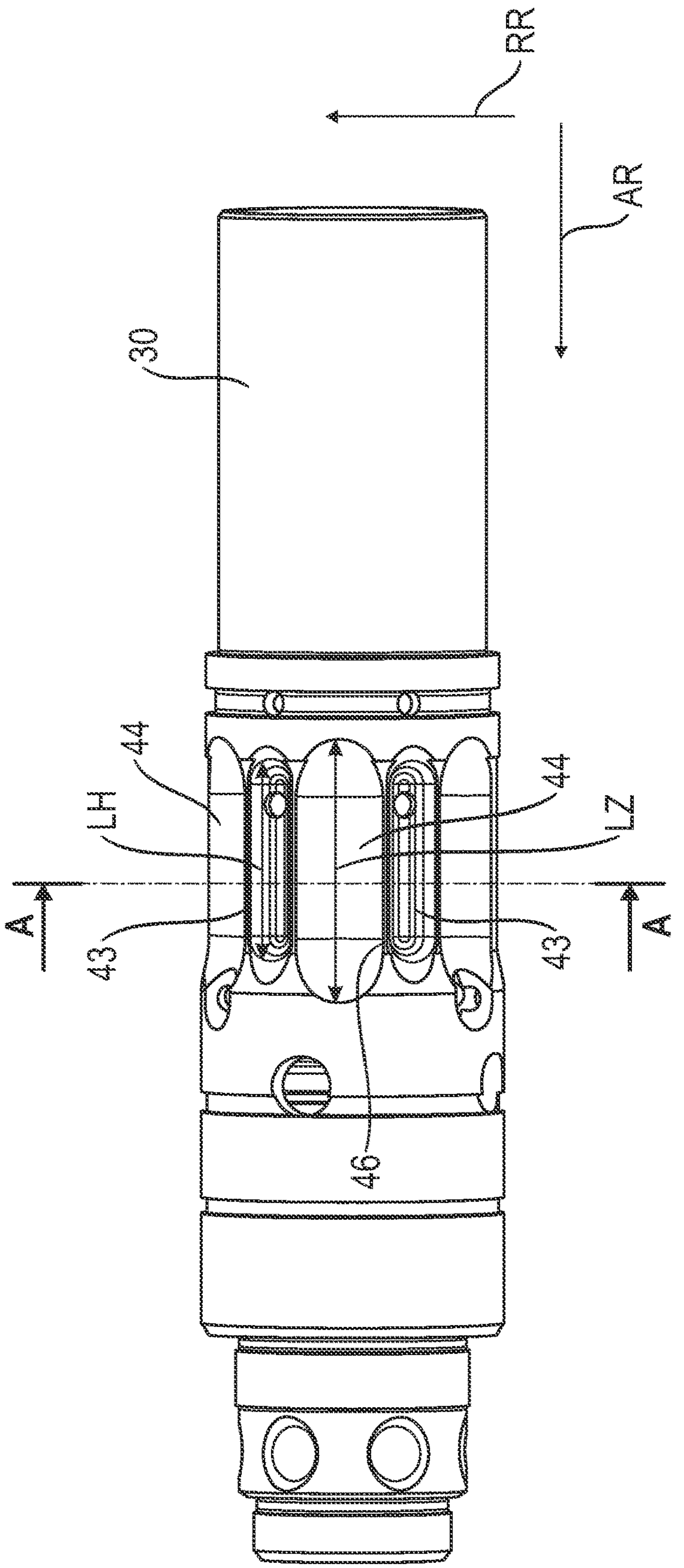
FIG. 2A shows a guide tube in a side view with indicated section line A-A according to a first preferred exemplary embodiment.
Figure 2B:
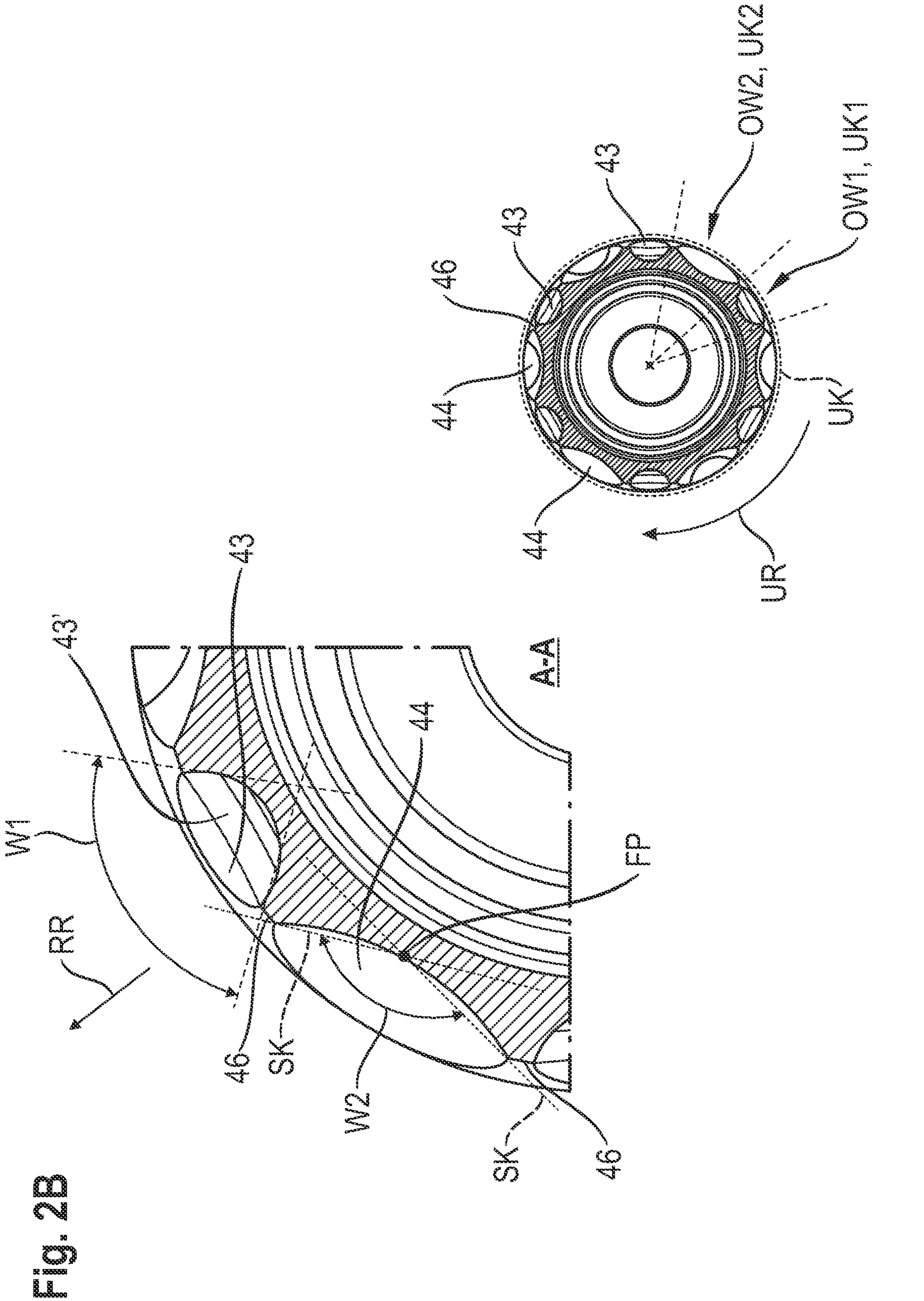
FIG. 2B shows a section view A-A (radial section plane) from FIG. 2A.

FIGS. 2A and 2B show a first preferred exemplary embodiment of a guide tube 30. The guide tube 30 is intended for an electric hand-held power tool 100 (cf. FIG. 1). FIG. 2A here shows the guide tube 30 in a side view with indicated section line A-A. The section A-A (radial section plane) is illustrated in FIG. 2B. The guide tube 30 has six main latching depressions 43, which are arranged on the guide tube 30 in the circumferential direction UR. In an alternating manner to the main latching depressions 43, there are formed six auxiliary depressions 44 in the guide tube 30.

As can be taken from FIG. 2B, the main latching depression 43, which is groove-shaped in form, does not have a constant radius of curvature in the radial section plane A-A. The opening angle W1 of the main latching depression 43 is predefined by that flank portion 43' of the main latching depression 43 that has the longest extent in the radial direction RR. The opening angle W1 of the main latching depression 43 is, by way of example, 75 degrees. As can likewise be taken from FIG. 2B, the auxiliary depression 44 in the form of a groove has a constant radius of curvature KR. An opening angle W2 of the auxiliary depression 44 is spanned in the radial section plane A-A by those secants SK which, on the one hand, are in each case tangent to the web 46 and which, on the other hand, intersect at the base point (the "deepest" point) of the auxiliary depression 43. The opening angle W2 of the auxiliary depression 44 is, by way of example, formed to be 135 degrees. Consequently, the opening angle W2 of the auxiliary depression 44 is larger than the opening angle W1 of the main latching depression 43. By virtue of the comparatively smaller opening angle W1 of the main latching depression 43, the main latching depression 43 serves for actually transmitting a working torque from the function setting tube 20 (cf. FIG. 1B) to the guide tube 30. The auxiliary depression 44 is merely intended to offer the coupling ball 45 a defined position along the circumferential direction UR of the guide tube 30, with the result that—independent of the rotary position of the guide tube 30—a displacement of the function setting tube 20 is possible in the axial direction AR.

As can likewise be taken from FIG. 2A, the auxiliary depression 44 has an auxiliary latching length LZ in the axial direction AR that is larger than a main latching length LH of the main latching depression 43. Furthermore, the auxiliary depression 44 is spaced apart in the circumferential direction UR from the main latching depression 43 by means of a web 46. By way of example, the web 46 has a thickness of 0.4 mm in the circumferential direction UR. It is clear that, by virtue of the small web thickness of the web 46, the coupling ball 45 either comes to lie in the main latching depression 43 or in the auxiliary depression 44.

FIG. 2B shows that an opening width OW2, with respect to a circumferential circle UK of the guide tube 30, of the auxiliary depression 44 is larger than an opening width OW1, with respect to the circumferential circle UK, of the main latching depression 43. The circumferential circle UK of the guide tube 30 is that circle which is tangent to all of the webs 46 of the guide tube. Here, the opening width OW1 of the main latching depression 43 corresponds to the arc length of that part UK1 of the circumferential circle UK that spans the main latching depression 43. Here, the opening width of the auxiliary depression OW corresponds to the arc length of that part UK2 of the circumferential circle UK that spans the auxiliary depression 44.

Figure 3A:
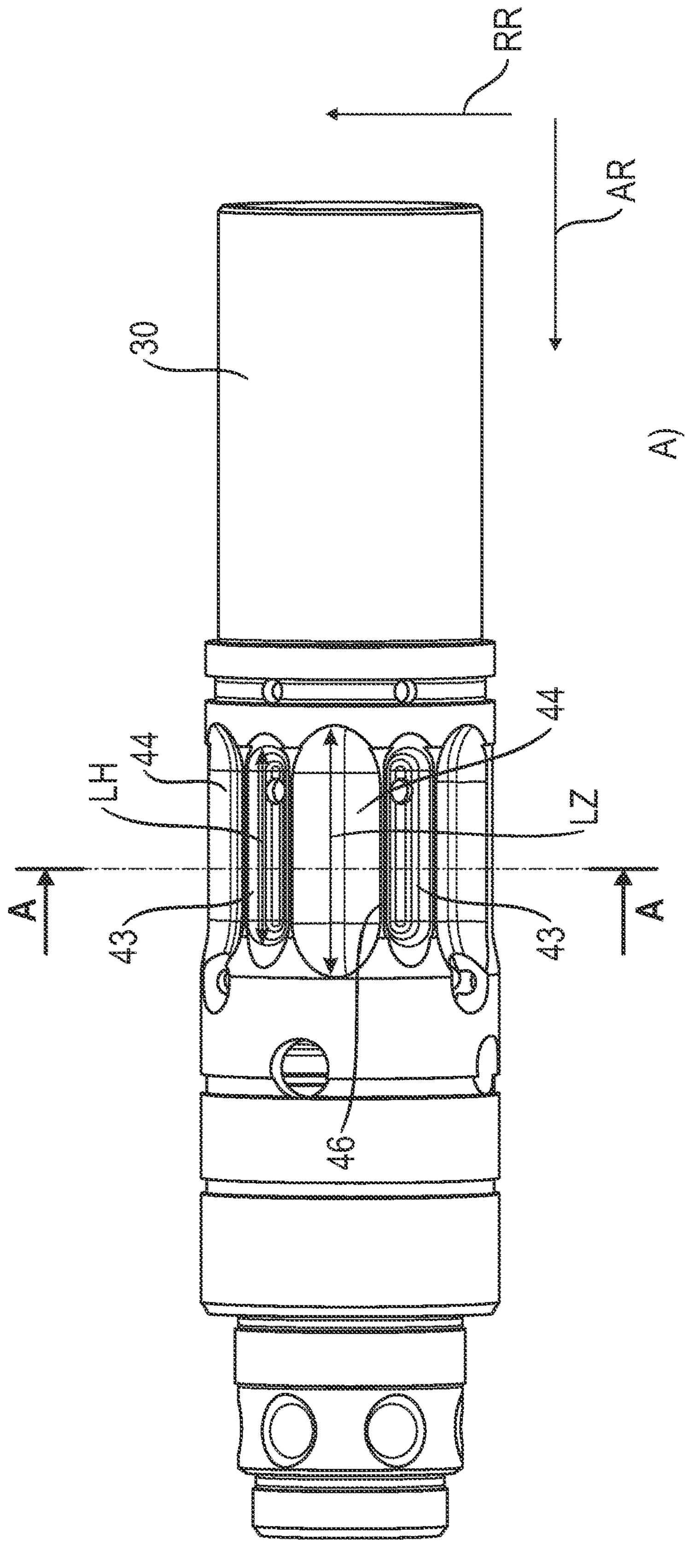
FIG. 3A shows a guide tube in a side view with indicated section line A-A according to a second preferred exemplary embodiment.
Figure 3B:
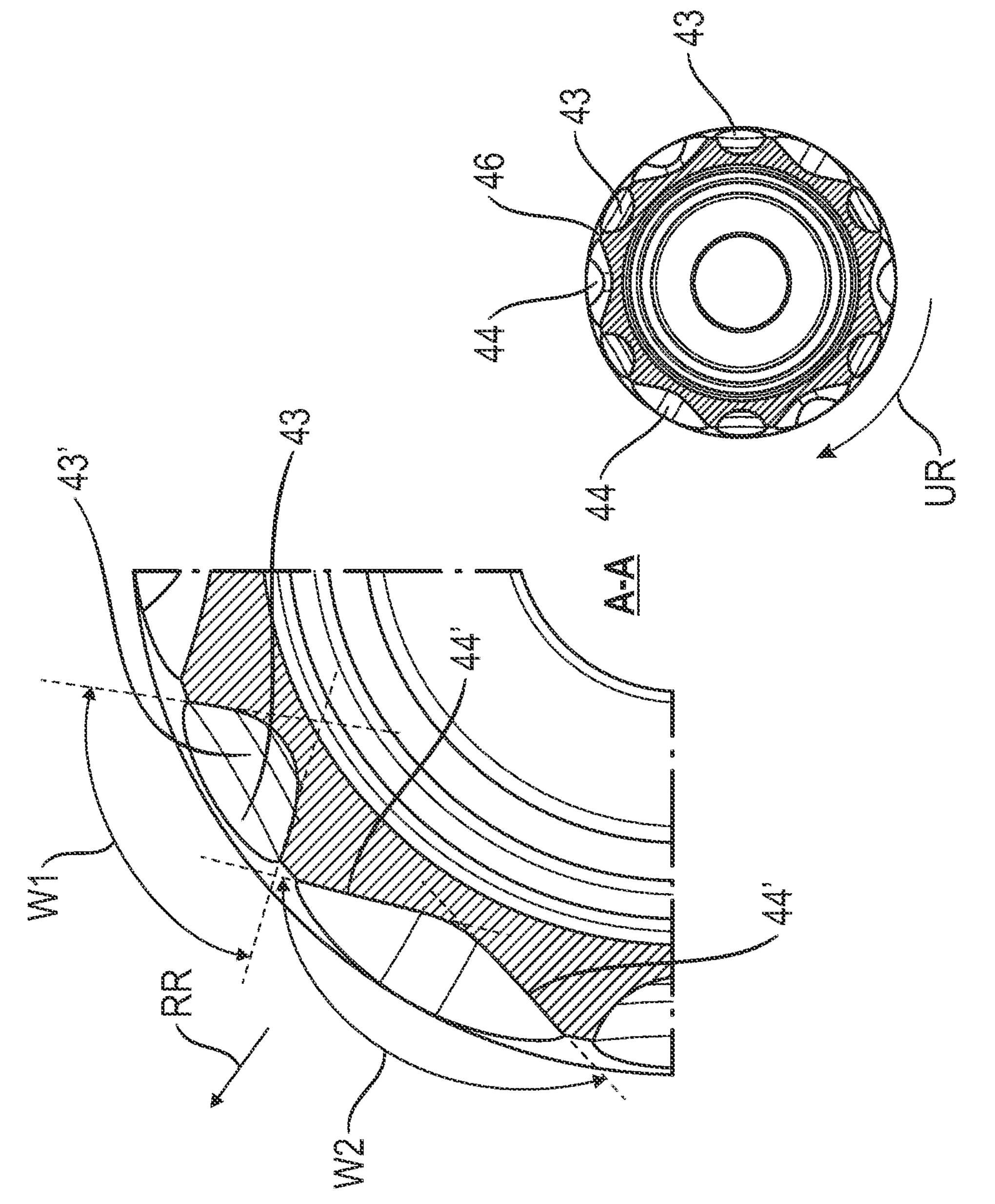
FIG. 3B shows a section view A-A (radial section plane) from FIG. 3A.

FIGS. 3A and 3B show a second preferred exemplary embodiment of a guide tube 30. The guide tube 30 is intended for an electric hand-held power tool 100 (cf. FIG. 1A). FIG. 3A here shows the guide tube 30 in a side view with indicated section line A-A. The section A-A (radial section plane) is illustrated in FIG. 3B. The guide tube 30 has six main latching depressions 43, which are arranged on the guide tube 30 in the circumferential direction UR. In an alternating manner to the main latching depressions 43, there are formed six auxiliary depressions 44 in the guide tube 30.

The main latching depressions 43 of the exemplary embodiment of FIGS. 3A and 3B are formed so as to be identical to the main latching depressions 43 of the exemplary embodiment of FIGS. 2A and 2B. Accordingly, the opening angle W1 of the main latching depression 43 is predefined by that flank portion 43' of the main latching depression 43 that has the longest extent in the radial direction RR. By contrast with the exemplary embodiment of FIG. 2, the auxiliary depression 44 of the guide tube 30 of FIG. 3 is stepped, that is to say in particular that the auxiliary depression 44 has two flanks 44' which run rectilinearly at least in certain portions, and thus does not have a constant radius of curvature. The opening angle W2 of the auxiliary depression 44 is spanned by the two flanks 44' which run rectilinearly at least in certain portions. The opening angle W2 of the auxiliary depression 44 is, by way of example, formed to be 135 degrees. Consequently, the opening angle W2 of the auxiliary depression 44 is larger than the opening angle W1 of the main latching depression 43.

Figure 4A:
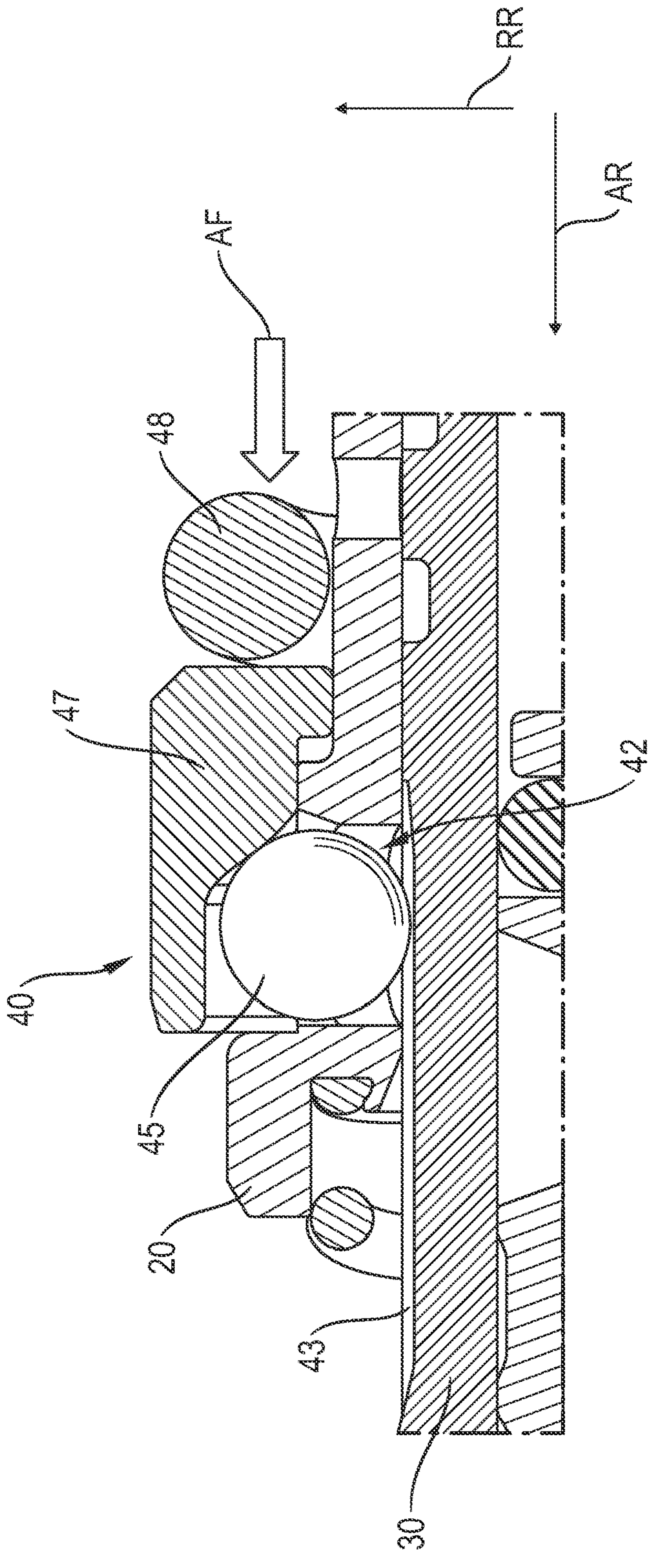
FIG. 4A shows a preferred exemplary embodiment of a ball-type latching clutch.

A preferred exemplary embodiment of a ball-type latching clutch 40 is illustrated in FIG. 4A. The ball-type latching clutch 40 serves to transmit the rotary movement from the function setting tube 20 to the guide tube 30. For this purpose, the ball-type latching clutch 40 is equipped with a radial aperture 42 formed in the function setting tube 20. The ball-type latching clutch 40 also has a coupling ball 45 mounted in the radial aperture 42. The coupling ball 45 is intended to engage in a main latching depression 43 which is formed in the guide tube 30. The ball-type latching clutch 40 has a cone ring 47 which is spring-loaded by means of the spring 48 and against whose actuating force AF the coupling ball 45 can deflect outward (upward in FIG. 4A) in the radial direction RR.

Figure 4B:
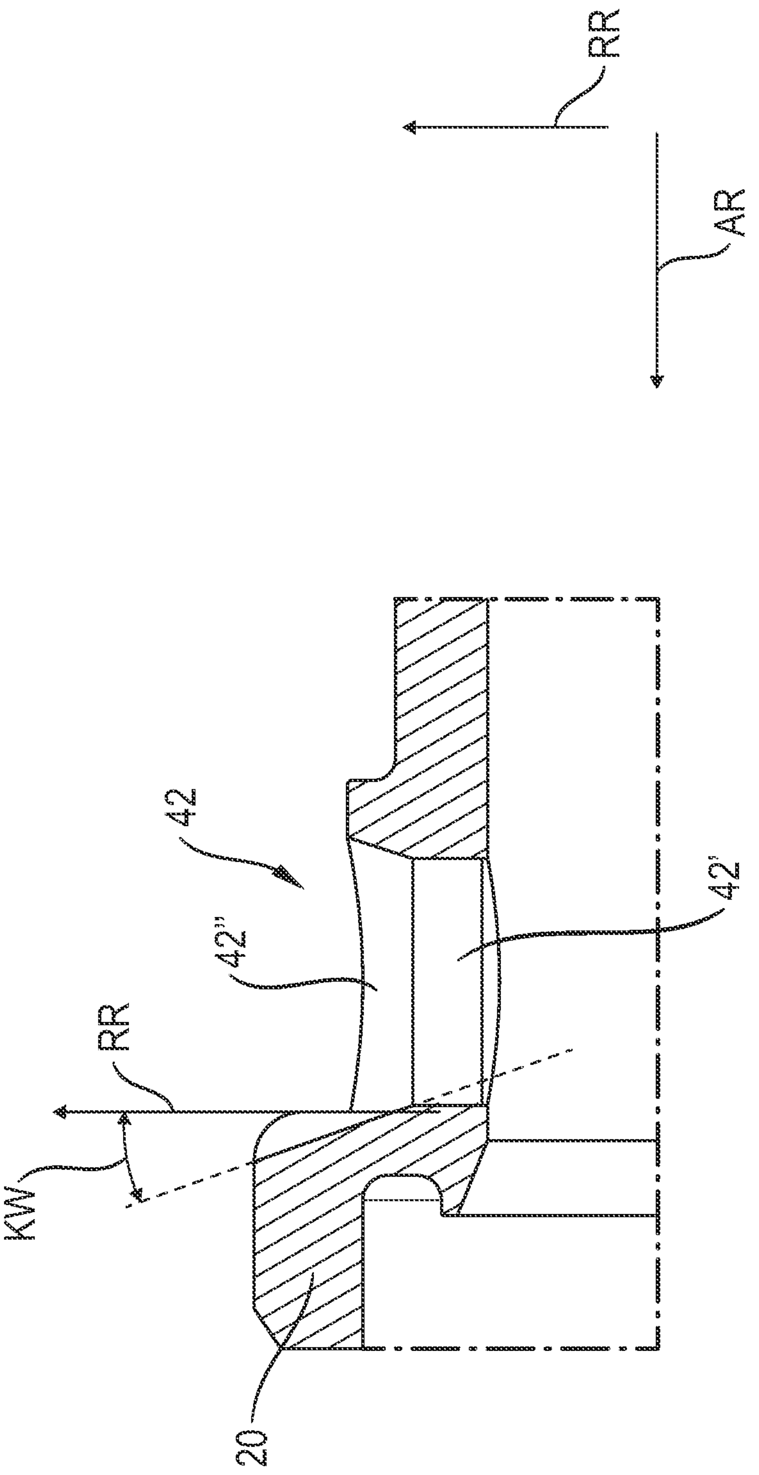
FIG. 4B shows a radial aperture in the function setting tube.

As can be taken from FIG. 4B, the radial passage 42, which is formed in the function setting tube 20 (cf. FIG. 4A), has a cylindrical passage 42' which is oriented coaxially to the radial direction RR. On the side of the radial passage 42' that faces away from the guide tube 30, there is formed a cone bevel 42" which, by way of example, has a cone angle KW of 20 degrees, with respect to the radial direction RR. This cone bevel 42" makes it easier for the coupling ball 45 to exit outward in the radial direction (cf. FIG. 4A, upward movement of the coupling ball 45).

Figure 4C:
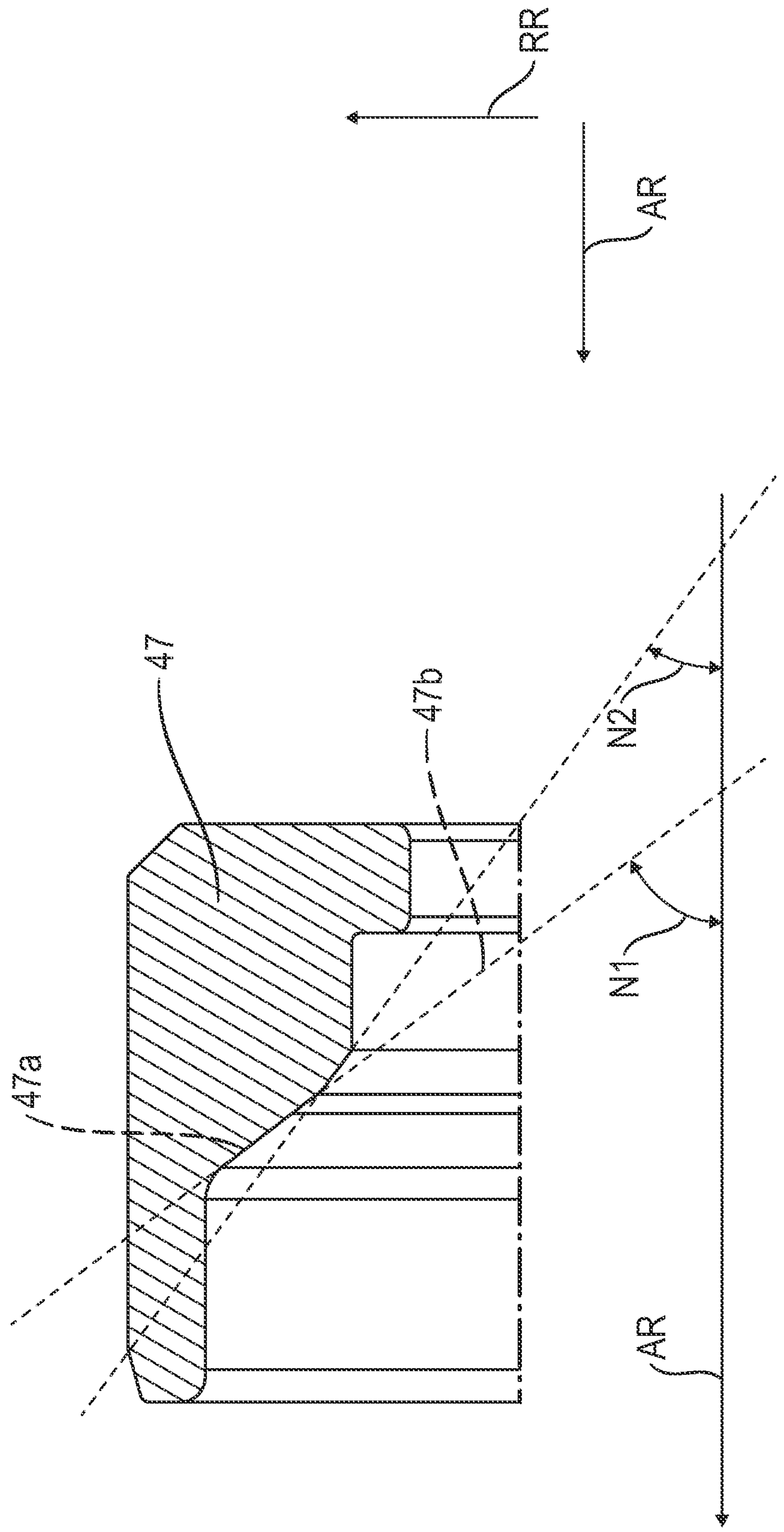
FIG. 4C shows a cone ring with a first and second cone shoulder.

FIG. 4C now shows a preferred embodiment of the spring-loaded cone ring 47. The cone ring 47 has a first cone shoulder 47*a* and a second cone shoulder 47*b*. The first cone shoulder 47*a* and the second cone shoulder 47*b* have different angles of inclination N1, N2 with respect to the axial direction AR. The first cone shoulder 47*a*, namely that cone shoulder which extends further away from the guide tube 30 in the radial direction RR, has, by way of example, an angle of inclination N1 of 55 degrees. The second cone shoulder 47*b* has, by way of example, an angle of inclination N2 of 38 degrees. By virtue of the formation of the spring-loaded cone ring 47 with the first cone shoulder 47*a* and the second cone shoulder 47*b*, it is possible—in combination with the cone bevel 42"— for an axial actuating force required for the movement of the function setting tube 20 to be considerably reduced. At the same time, it has been shown that a release torque realized by the ball-type latching clutch 45 is only minimally reduced.

FIG. 5 shows, finally, the hand-held power tool 100 of FIG. 1 in the chipping operating mode ME. The hand-held power tool 100 of FIG. 5 is likewise equipped with a pneumatic impact mechanism 50, which has an exciter piston 51 which is movable in the axial direction AR along a working axis AX within the guide tube 30. The exciter piston 51 is coupled via a connecting rod 53 to an impact-mechanism eccentric wheel 55, which is driven via an electric motor that has not been shown here. By means of the exciter piston 51, it is possible for there to be generated, within the guide tube 30, a periodic impact-mechanism pressure since, in the chipping operating mode ME shown in FIG. 1B, a vent opening 31 of the guide tube 30 is closed by the function setting tube 20.

Both the function setting tube 20 and the guide tube 30 are mounted in a housing 90 of the hand-held power tools 100 so as to be rotatable about the working axis AX. In the chipping operating mode ME, a rotation of the guide tube 30 is not desired. Accordingly, in the chipping operating mode ME, the function setting tube 20 is not driven so as to rotate about the working axis AX. Although the bevel gear 23 continues to drive the cone ring 25 already known from FIG. 1B, the latter is not in form-fitting engagement with the function setting tube 20—with respect to the circumferential direction UR. This is the case since the function setting tube 20, acted upon by the function selector switch 10 (cf. FIG. 1A), is displaced in the direction of the tool fitting 35 (on the left in FIG. 5), and a spur toothing 27 of the function setting tube 27 is spaced apart from the cone ring 25.

LIST OF REFERENCE SIGNS

10 Function selector switch
20 Function setting tube
23 Bevel gear
25 Cone ring
27 Spur toothing
30 Guide tube
31 Vent opening
35 Tool fitting
36 Chisel
40 Ball-type latching clutch
42 Radial aperture
42' Cylindrical passage
42" Cone bevel
43 Main latching depression
43' Flank portion
44 Auxiliary depression
44' Flanks
45 Coupling ball
46 Web
47 Cone ring
47*a* First cone shoulder
47*b* Second cone shoulder
48 Compression spring
50 Impact mechanism
51 Exciter piston
53 Connecting rod
55 Impact-mechanism eccentric wheel
90 Housing
100 Electric hand-held power tool
AF Actuating force
AR Axial direction
AX Working axis
BH Hammer drilling operating mode
FP Base point
KW Cone angle
KR Radius of curvature
LH Main latching length
LZ Auxiliary latching length
ME Chipping operating mode
N1 Angle of inclination of the first cone shoulder
N2 Angle of inclination of the second cone shoulder
OW1 Opening width of the main latching depression
OW2 Opening width of the auxiliary depression
RR Radial direction
SK Secant
UK Circumferential circle
UK1 Proportion of the circumferential circle over the main latching depression
UK2 Proportion of the circumferential circle over the auxiliary depression
UR Circumferential direction
W1 Opening angle of the main latching depression
W2 Opening angle of the auxiliary depression

What is claimed is:

1. An electric hand-held power tool comprising:

a function setting tube actuatable via a manual function selector switch to bring about various operating modes;

a guide tube equipped with a tool fitting and a main latching depression and an auxiliary depression different from the main latching depression; and a ball latching clutch for transmitting a rotary movement from the function setting tube to the guide tube, wherein the ball latching clutch has a radial aperture formed in the function setting tube, a coupling ball being mounted in the radial aperture and intended to engage in the main latching depression, and a spring-loaded cone ring, the coupling ball being deflectable in a radial direction against an actuating force of the spring-loaded cone ring, the auxiliary depression providing a defined position for the coupling ball and having an opening angle larger than an opening angle of the main latching depression and being longer than a diameter of the coupling ball in an axial direction to permit axial movement of the coupling ball in the auxiliary depression, an opening width, with respect to a circumferential circle of the guide tube, of the auxiliary depression being larger than an opening width, with respect to the circumferential circle, of the main latching depression.

2. The hand-held power tool as recited in claim 1 wherein the opening angle of the main latching depression is between 70 degrees and 80 degrees.

3. The hand-held power tool as recited in claim 2 wherein the opening angle of the main latching depression is 75 degrees.

4. The hand-held power tool as recited in claim 1 wherein the opening angle of the auxiliary depression is larger than 90 degrees.

5. The hand-held power tool as recited in claim 4 wherein the opening angle of the auxiliary depression is larger than 120 degrees.

6. The hand-held power tool as recited in claim 1 wherein the auxiliary depression is longer than the main latching depression in an axial direction.

7. The hand-held power tool as recited in claim 1 wherein the main latching depression or the auxiliary depression is groove-shaped in form in an axial direction.

8. The hand-held power tool as recited in claim 1 wherein the main latching depression and the auxiliary depression are spaced apart by a web in a circumferential direction of the guide tube.

9. The hand-held power tool as recited in claim 8 wherein the web has a web width of less than 1 millimeter.

10. The hand-held power tool as recited in claim 1 wherein the cone ring has a first cone shoulder and a second cone shoulder having different angles of inclination with respect to an axial direction.

11. The hand-held power tool as recited in claim 1 wherein that the radial aperture has a cylindrical passage with a cone bevel.

12. The hand-held power tool as recited in claim 11 wherein the cone bevel has a cone angle of 20 degrees.

13. The hand-held power tool as recited in claim 1 wherein the guide tube has a plurality of main latching depressions and a plurality of auxiliary depressions alternating along a circumferential direction of the guide tube.

14. The hand-held power tool as recited in claim 1 wherein the hand-held power tool is a hammer drill or a rotary hammer.

15. The hand-held power tool as recited in claim 1 wherein the auxiliary depression has flanks.

16. The hand-held power tool as recited in claim 1 wherein the auxiliary depression has a constant radius of curvature.

17. An electric hand-held power tool comprising:

a function setting tube actuatable via a manual function selector switch to bring about various operating modes;

a guide tube equipped with a tool fitting and a main latching depression and an auxiliary depression different from the main latching depression; and a ball latching clutch for transmitting a rotary movement from the function setting tube to the guide tube, wherein the ball latching clutch has a radial aperture formed in the function setting tube, a coupling ball being mounted in the radial aperture and intended to engage in the main latching depression, and a spring-loaded cone ring, the coupling ball being deflectable in a radial direction against an actuating force of the spring-loaded cone ring, the auxiliary depression having an opening angle larger than an opening angle of the main latching depression;

wherein the auxiliary depression is longer than the main latching depression in an axial direction.

18. An electric hand-held power tool comprising:

a function setting tube actuatable via a manual function selector switch to bring about various operating modes;

a guide tube equipped with a tool fitting and a main latching depression and an auxiliary depression different from the main latching depression; and a ball latching clutch for transmitting a rotary movement from the function setting tube to the guide tube, wherein the ball latching clutch has a radial aperture formed in the function setting tube, a coupling ball being mounted in the radial aperture and intended to engage in the main latching depression, and a spring-loaded cone ring, the coupling ball being deflectable in a radial direction against an actuating force of the spring-loaded cone ring, the auxiliary depression having an opening angle larger than an opening angle of the main latching depression;

wherein that the radial aperture has a cylindrical passage with a cone bevel.

19. The hand-held power tool as recited in claim 18 wherein the cone bevel has a cone angle of 20 degrees.

* * * * *